United States Patent Office 2,861,012
Patented Nov. 18, 1958

2,861,012

FIREPROOF TAR COMPOSITION

Bernard Lowell, Oakland, Calif.

No Drawing. Application June 27, 1955
Serial No. 518,356

7 Claims. (Cl. 117—137)

This invention relates to a composition of matter, and more particularly to a fireproof tar composition adapted for such end uses as roofing, the production of fire retardant tar paper, and the like.

The essential object of this invention is to provide a tar composition having improved fire resistant and moisture repellent properties.

This and other objects and advantages of the invention will be apparent from the following description wherein there is set forth a preferred composition and two alternate compositions exemplifying the subject invention.

The preferred composition is as follows:

| | Percent |
|---|---|
| Tar | 46 |
| Sodium silicate (powder) | 11 |
| Carbamide phosphoric acid | 20 |
| Ammonium sulfate | 23 |

First, the tar is melted; then the balance of the constituents are mixed into the melted tar; and the mixing is continued until the mixture is cooled to substantially room temperature.

Experimental work with this composition indicates that the ammonium sulfate materially enhances the water repellent properties of the tar, while the specific combination of the carbamide phosphoric acid and sodium silicate imparts to the tar an unexpected degree of fire resistance.

When this composition was applied to a thin strip of wood by dipping the wood into the tar, the uncoated portion of the wood flamed briskly when ignited, but the flaming ceased abruptly when the coated portion of the wood was reached. The tar coating melted and foamed when the flame of a Meeker burner was played on it, but the tar did not ignite, nor was there any indication of burning when the burner was removed.

A further composition is as follows:

| | Percent |
|---|---|
| Tar | 55 |
| Sodium silicate (powder) | 23 |
| Ammonium sulfate | 22 |

This particular composition also had the properties of being water repellent and fire resistant, but its fire resistance was not as good as that of the preferred composition.

Still a further composition is as follows:

| | Percent |
|---|---|
| Tar | 55 |
| Carbamide phosphoric acid | 23 |
| Ammonium sulfate | 22 |

This particular composition likewise had the properties of being water repellent and fire resistant. Its resistance to fire, however, while being somewhat better than that of the tar-sodium silicate-ammonium sulfate composition, was not as great as that of the preferred composition.

A further physical distinction between the first-mentioned, or preferred, composition, on the one hand, and the two alternate compositions, on the other, is that the former had no tendency to melt and run off of the dip stick when heated with the Meeker burner, whereas the latter two compositions did have such a tendency to melt and run.

A tar paper having excellent fire resistance was prepared in the following manner: paper having somewhat the same texture as chemical filter paper was dipped in a 10% aqueous solution of phosphoric acid; the paper was then dried, either by air or heat; and a coating composition, consisting of 12 parts tar, 40 parts tricresyl phosphate, 12 parts ammonium sulfate, 18 parts carbamide phosphoric acid, and 18 parts of waterglass solution, was applied to the paper. The tricresyl phosphate, ammonium sulfate, and carbamide phosphoric acid were added to and mixed with melted tar; the mixture was allowed to cool to substantially room temperature; and the waterglass solution was added under agitation. An approximately 40° Bé. waterglass solution may be used.

The paper may be pre-treated by dipping in other dilute acid solutions, such as hydrochloric acid, nitric acid, or sulfuric acid. For example, a solution of 5% sulfuric acid in water may be used to good advantage, i. e. the increasing of the tar absorptive power of the paper.

The tar solution may be applied in either a heated or cool condition to the paper, with the former condition being preferred from the standpoint of ease of application and uniformity of resultant coating.

What is claimed is:

1. A fire resistant and water repellent composition of matter comprising a major amount of tar, sodium silicate, carbamide phosphoric acid, and ammonium sulfate.

2. A fire resistant and water repellent composition of matter comprised of 46% by weight of tar, 11% sodium silicate, 20% carbamide phosphoric acid, and 23% ammonium sulfate.

3. A fire resistant and water repellent composition of matter comprising a major amount of tar, carbamide phosphoric acid and ammonium sulfate.

4. A fire resistant and water repellent composition of matter comprised of 55% by weight of tar, 23% of carbamide phosphoric acid and 22% ammonium sulfate.

5. A coating composition adapted for the fireproofing of paper comprising a major amount of tar, tricresyl phosphate, ammonium sulfate, carbamide phosphoric acid, and waterglass.

6. A coating composition adapted for the fireproofing of paper comprising 12 parts tar, 40 parts tricresyl phosphate, 12 parts ammonium sulfate, 18 parts of carbamide phosphoric acid, and 18 parts of waterglass solution.

7. A method of making fireproof tar paper comprising dipping said paper in a weak solution of inorganic acid in water, drying said paper, and applying to said paper a coating composition consisting of: 12 parts tar, 40 parts tricresyl phosphate, 12 parts ammonium sulfate, and 18 parts of waterglass solution.

References Cited in the file of this patent

UNITED STATES PATENTS

| 170,829 | Dunham | Dec. 7, 1875 |
| 2,089,697 | Groebe | Aug. 10, 1937 |
| 2,568,849 | Fasold et al. | Sept. 25, 1941 |

FOREIGN PATENTS

| 603,425 | Great Britain | June 16, 1948 |